Jan. 6, 1959　　　B. A. SCHEPMAN　　　2,867,330
FILTER CONSTRUCTION
Filed Sept. 22, 1955　　　　　　　　　4 Sheets-Sheet 1
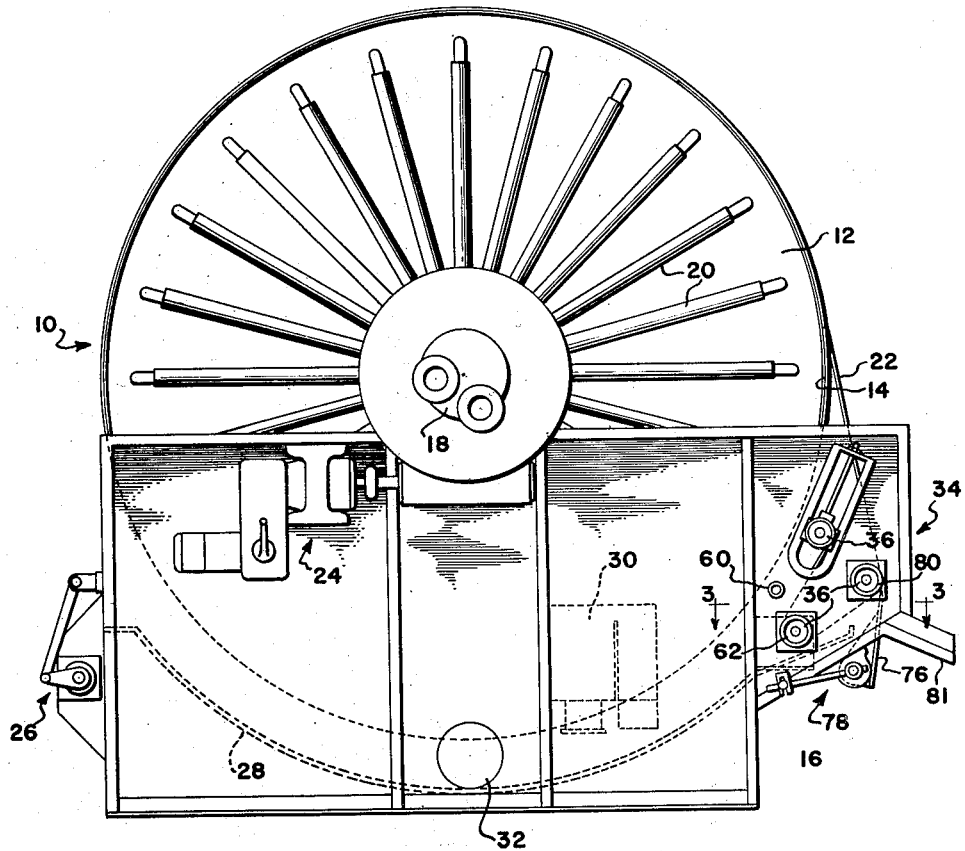
INVENTOR
BERNE A. SCHEPMAN
BY *Harold T. Stowell*
ATTORNEY

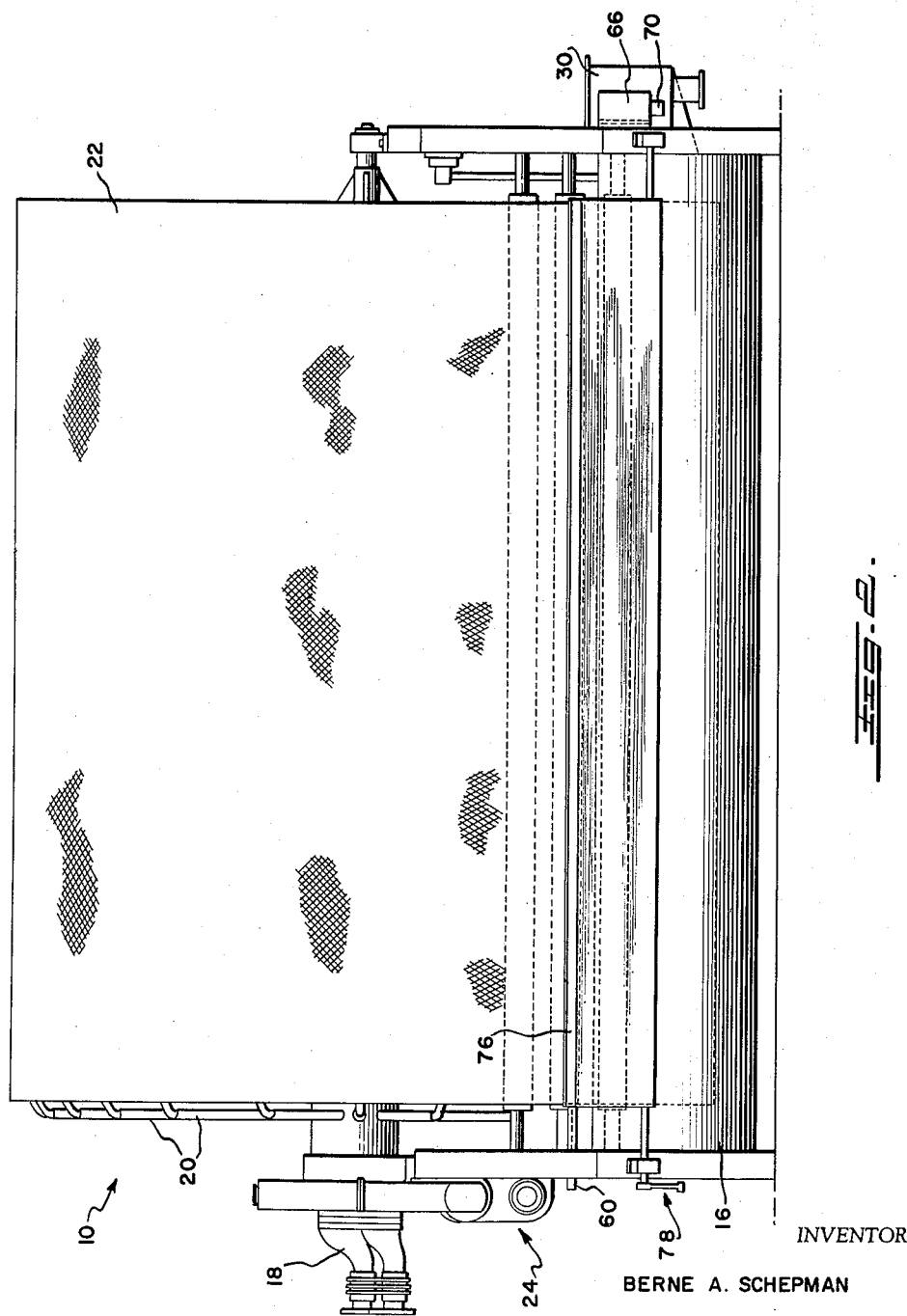

Jan. 6, 1959
B. A. SCHEPMAN
2,867,330
FILTER CONSTRUCTION
Filed Sept. 22, 1955
4 Sheets-Sheet 3
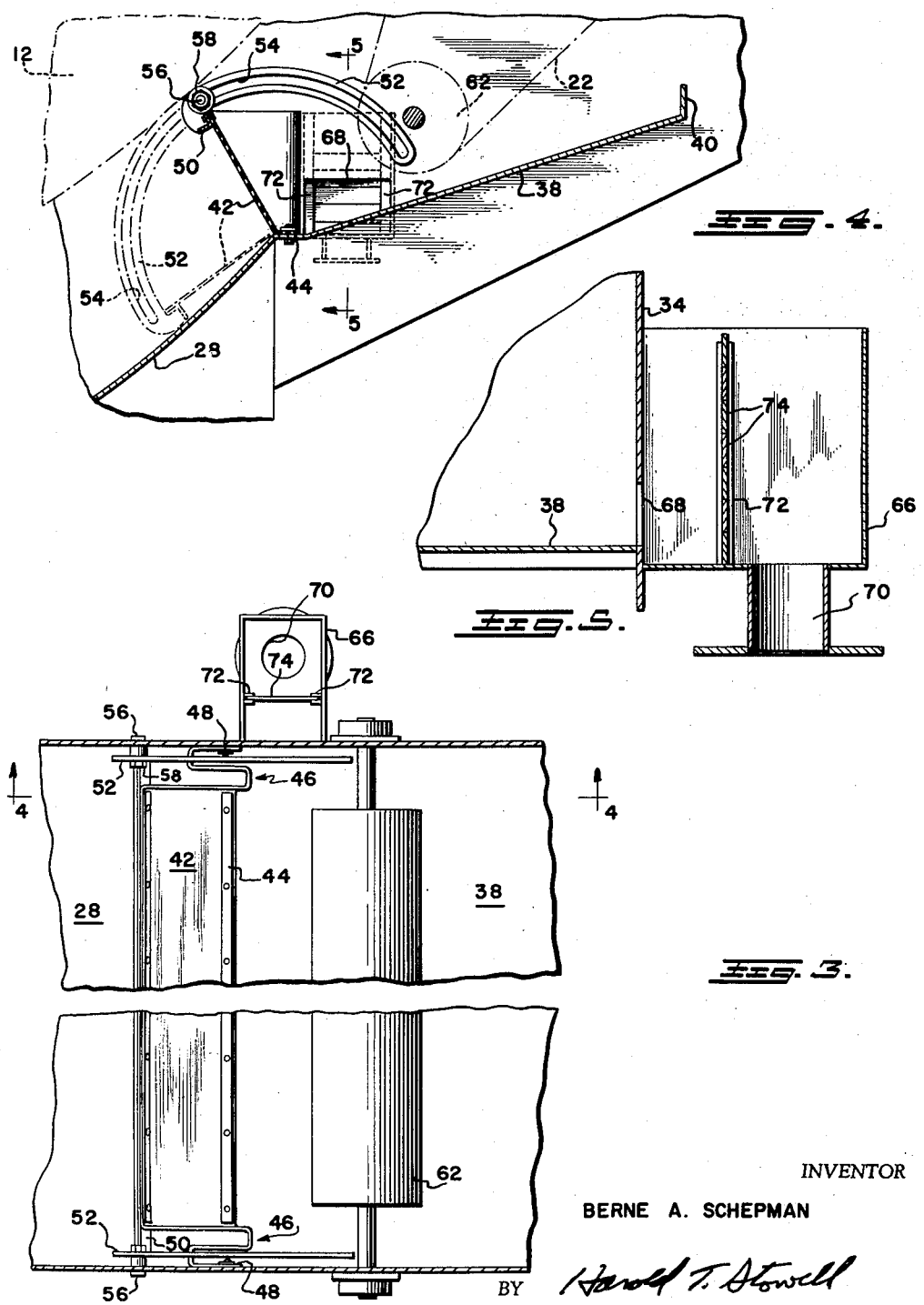
INVENTOR
BERNE A. SCHEPMAN
BY Harold T. Stowell
ATTORNEY Jan. 6, 1959 B. A. SCHEPMAN 2,867,330
FILTER CONSTRUCTION
Filed Sept. 22, 1955 4 Sheets-Sheet 4
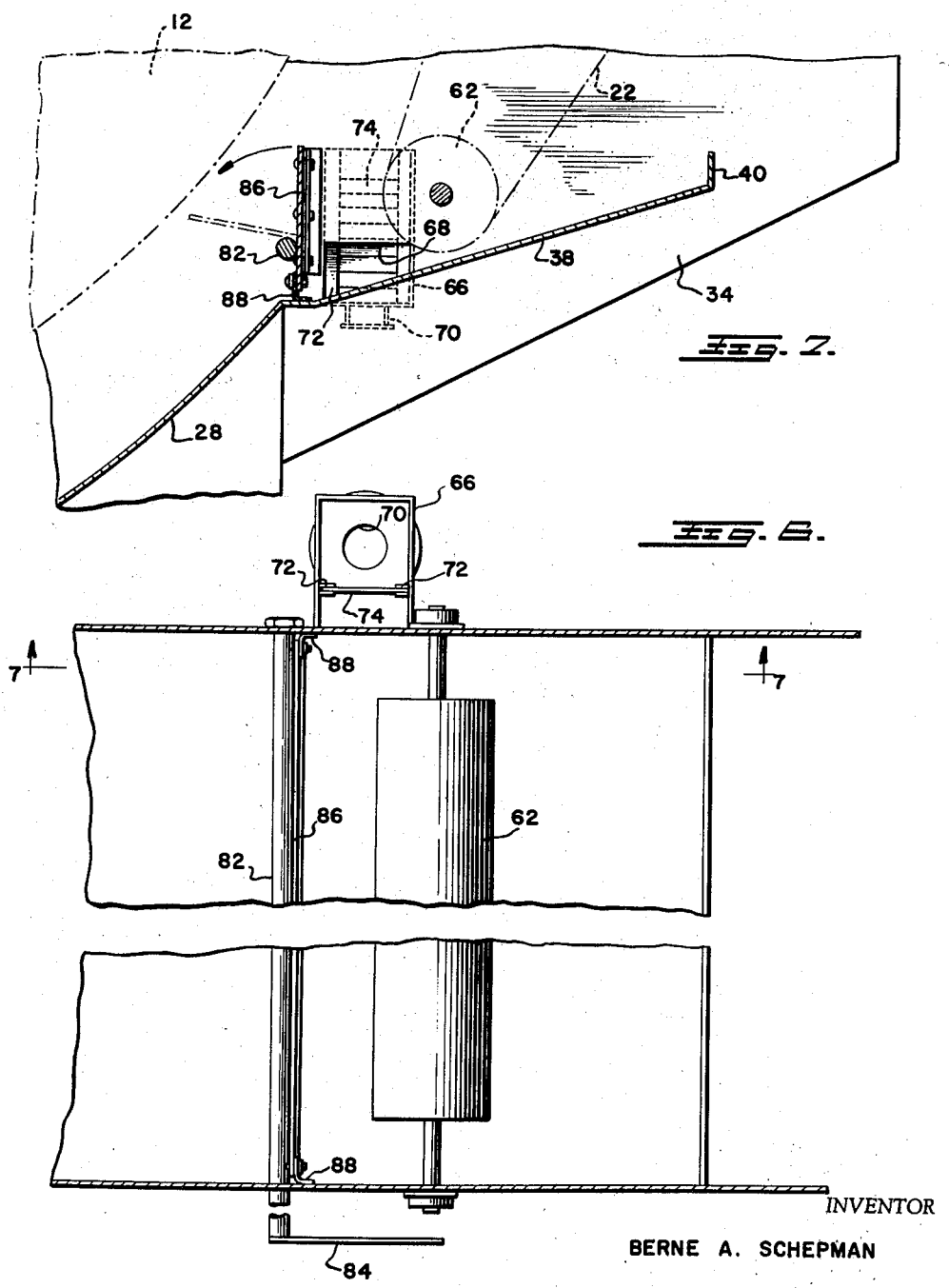
INVENTOR
BERNE A. SCHEPMAN
BY Harold T. Stowell
ATTORNEY

2,867,330

FILTER CONSTRUCTION

Berne A. Schepman, Mundelein, Ill., assignor, by mesne assignments, to The Eimco Corporation, Salt Lake City, Utah, a corporation of Delaware Application September 22, 1955, Serial No. 535,896

4 Claims. (Cl. 210—392)

This invention relates to new and improved filtration apparatus and more particularly and specifically to filter media washing apparatus for rotary drum filters of the pressure or vacuum type.

Conventional rotary drum filters include a rotary drum member provided with a peripheral filter deck divided into a plurality of segments by means of partition members and division strips with each of the drum sections connected through valve means to suction and/or blow devices whereby the sections of the drum may be selectively placed under pressure blow-down for removal of filter cake from the drum deck or they may be placed under suction for forming filter cake on the deck. The drums are rotated in a tank or bath containing a slurry of material to be filtered, and means is provided for discharging filtrate from within the drum wherein it is collected after passing through the filter media upon the drum deck.

In certain of the conventional filter drums of the type referred to above, an endless filter medium in belt or web form has been used about the deck of the drum and the filter cake forms on this medium. Several prior drum filters using such filter belts or webs have provided apparatus to pass the web outward from the drum deck at one point thereon and over cake removal roller structures located at a spaced distance away from the drum and out of communication with the slurry tank within which the drum rotates. By these prior constructions the filter cake can be removed by scraping and by the solvent action of water or chemical sprays without subjecting the slurry to contamination by the recovered cake or by the cake solvent wash solutions. One such prior device is described and disclosed in co-pending application for U. S. patent Serial No. 518,747.

However, I have discovered that in cleaning rotary drum filter webs at a point remote to the drum and the slurry feed tank in which it rotates it is very desirable to provide apparatus which will permit the use of a minimum amount of wash solution to free the filter web of deposits. This is particularly true in filtration operations wherein it is necessary to utilize costly wash chemicals as opposed to water for the purpose of effectively cleaning the web.

Accordingly it is therefore a general object of this invention to provide new and substantially improved filter medium cleaning and washing apparatus for rotary drum filter constructions wherein the filter medium or web is subjected to continuous cleaning operations during filtering operation.

A primary object of the present invention is the provision of filter medium or web washing apparatus for rotary drum filter constructions which requires the utilization of a minimum amount of wash liquid to effectively and efficiently clean and remove blinding deposits from the filter medium or web of the filter drum.

Another object of this invention is the provision of filter medium or web washing apparatus for rotary drum filter constructions in which a cleaning or washing bath, through which the filter web passes, may be maintained at selected and readily controlled depths to the end result of conserving wash liquids necessary to effectively and efficiently clean the filter web.

Still another object of this invention is the provision of filter medium or web washing apparatus for use with rotary drum filters which provides a wash liquid bath of selectively controlled depth wherein the filter cake is removed from the travelling web before the web enters the bath thereby permitting the cake to be recovered and discharged without being introduced into the wash bath or into the feed slurry bath in which the filter drum rotates.

A further object of this invention is the provision of filter web washing apparatus for use with rotary drum filters which provides for a bath of washing liquid through which the web travels of controlled depth and in which means are provided for selectively dumping the entire bath to flush excessive solid accumulation therefrom into the slurry feed bath in which the filter drum rotates.

Still a further object of the present invention resides in the provision of wash apparatus for the filter web of a rotary filter drum which effectively and efficiently separates the washing liquid from the feed slurry at all times during both the filtration and the web washing operations.

Another and still further object of this invention is the provision of filter web washing apparatus for rotary drum filter constructions which is of simple and inexpensive design, manufacture and operation and which serves to substantially increase the effectiveness and efficiency of operation of rotary drum filters of the filter belt type.

Still further objects and advantages of this invention will become readily evident to those skilled in the art when the hereinafter general statement and description are read in the light of the accompanying drawings.

The nature of the present invention may be stated in general terms as consisting of filter web washing apparatus for the travelling filter web of a rotary drum filter wherein a wash liquid bath is maintained at a remote point to the drum, guide rollers are immersed within the bath and pass the continuous filter web thereover through said bath, means for introducing cleaning liquid into said bath, means for discharging cleaning liquid from said bath, a dam composed of a plurality of superimposed removable weirs interposed between the bath and the wash liquid discharge therefrom whereby the depth of the bath may be selectively controlled, and means for selectively dumping the entire bath into the feed slurry for said rotating drum to effectively flush solids accumulated with said bath.

Referring now to the accompanying drawings in which like numerals designate similar parts throughout the several views:

Fig. 1 is an end elevation of the rotary drum filter apparatus constituting the present invention.

Fig. 2 is a front elevation of the apparatus shown in Fig. 1.

Fig. 3 is an enlarged fragmentary horizontal section taken on line 3—3, Fig. 1.

Fig. 4 is a vertical section taken on line 4—4, Fig. 3.

Fig. 5 is a vertical section taken on line 5—5, Fig. 4.

Fig. 6 is a view similar to Fig. 4 of a modified form of the invention.

Fig. 7 is a vertical section taken on line 7—7, Fig. 6.

Referring now to the accompanying drawings, and with particular reference to Fig. 1 thereof, 10 generally designates a rotary drum filter which includes a drum 12 having a filter deck 14 peripherally thereabout with the drum being mounted at each end thereof for rotation in a tank 16 which receives and retains a slurry bath therein of the material to be filtered.

One end of the drum is provided with a filter valve assembly designated at 18 which permits a vacuum to be drawn in certain portions of the drum interior while a blow-down pressure is introduced into other portions of the drum interior. A plurality of conduits 20 extend radially of the end of the drum and connect the filter valve assembly with drainage channels (not shown) which are formed in division strips in the filter deck of the drum.

A filter medium 22 which takes the form of an endless web or belt of woven fabric or metallic screen or the like extends peripherally about the filter deck of the drum across the entire width of the deck in such a manner that the filter medium rotates with the drum into and out of the slurry in the tank 16 whereupon the slurry liquid filters through the web to the interior of the drum and the solid content of the slurry forms a cake upon the outer face of the filter web from which it is removed in a manner to be hereinafter described.

Additionally associated with the rotary filter element is a conventional drive means generally designated at 24 for producing controlled rotation of the filter drum relative to the slurry and a vibratory apparatus 26 carried on the side of the slurry tank 16.

The slurry tank 16, which is of generally rectangular configuration, is provided with a concave plate 28 which extends longitudinally throughout the length of the tank forming a raised bottom therein coinciding with but spaced below the circular configuration of the rotary drum 12 thereabove. The tank is provided with a feed inlet 30 for introducing slurry thereinto and is provided also with suitable drain outlets 32 for clean-out purposes.

The tank 16 is provided on one longitudinal side thereof with an outwardly projecting rectangular extension or trough portion 34 which extends throughout the length of the tank and in which is located the web washing apparatus constituting a part of the present invention. Extending longitudinally throughout the length of the trough 34 is a series 36 of spaced tension and guide rollers over which the web travels in its path through the washing apparatus.

The wash apparatus within the trough 34, as best seen in Figs. 3 through 5, includes an upwardly and outwardly sloping pan 38 formed in extension of the curved bottom plate 28 of the slurry tank, this pan being provided with a vertical upstanding lip 40 throughout the length of its upper, outermost extremity. The pan 38 and its upstanding lip extend longitudinally of the trough between the end walls thereof forming together with a flexible partition secured to the inner, lowermost end of the pan a container for a bath of filter web cleaning material. The flexible partition 42 is secured along its lowermost edge by a suitable liquid-tight joint 44 to the bottom innermost end of the pan member 38 while its extreme ends are doubled upon themselves, as at 46, in a bellows-like arrangement where they are secured by a second liquid-tight joint 48 to the inner faces of the end walls of the trough 34. By this arrangement the inclination of the flexible partition 42 to and away from a vertical position is permitted upon adjustment of the positioning of the upper end of the partition in a manner to be hereinafter described while at all times maintaining a liquid-retaining wall longitudinally of the trough 34 in conjunction with the pan 38.

The upper longitudinal edge of the flexible partition 42 carries an angular frame member 50 the ends of which are secured to one end of each of a pair of arcuate brackets 52. Each of the bracket members 52 is provided with a longitudinal slot 54 extending throughout a substantial portion of the length thereof and each of these slots engages a stud 56 which is fixed in the adjacent side wall of the trough 34. The inner ends of each of the studs 56 carries a clamping nut 58 which enable the selective locking of the arcuate brackets 52 and the flexible partition 42 in positions intermediate the extreme ends of the slots 54 in said brackets, thereby adjusting the angular inclination of flexible partition 42 (as seen in Fig. 4).

A wash water or liquid feed pipe 60 extends longitudinally of the trough 34 substantially centrally above the pan 38 in such a position relative to the lowermost roller 62 of the roller series 36, which roller 62 is positioned centrally within and at a close spaced distance from the bottom of the pan 38, so that wash liquid carried by pipe 60 can be discharged either directly into the pan 38 or it may be discharged through spray heads (not shown) against the travelling web 22 at a position directly above the pan 38 where it leaves the roller 62. One end wall of the trough 34 carries an overflow outlet for wash liquid in the pan 38 which overflow outlet consists of an overflow box 66 carried on the outer face of the end wall of the trough 34 and having communication with the trough interior adjacent the bottom of the pan through an outlet opening 68 entering into the side of the box adjacent the bottom thereof. The overflow box is provided with a bottom outlet 70 adjacent the outer wall thereof and a pair of oppositely disposed tracks 72 are secured to the side walls of the box intermediate the bottom outlet 70 and the outlet 68 from the trough into the box so that a series of weirs 74 may be slidably positioned in superimposed relationship in the opposed tracks 72 in the box forming an adjustable dam between the trough outlet 68 and the overflow box outlet 70. By this construction the depth of the cleaning liquid within the pan may be easily controlled by selective control of the height of the dam formed by the removable weirs 74 which will control the overflow discharge from the pan at the selected dam height dependent upon the number of weirs utilized.

To complete the washing apparatus construction, a scraper or doctor knife 76 having conventional means generally designated at 78 (Fig. 1) for adjusting the position thereof, is located longitudinally of the underside of the trough 34 to project upwardly thereinto at a point spaced outwardly from the lip 40 of the pan 38 where the knife engages the web 22 as it passes around a discharge roller 80 in the roller series 36. Immediately below the line of knife engagement with the web, the trough 34 is provided with a dry discharge chute 81 into which filter cake removed from the web by the roller 80 and knife 76 drops and discharges by gravity to a collection point.

By the foregoing it becomes readily evident that filter web washing apparatus has been provided wherein a bath of wash liquid can be maintained at selectively controlled depths within the trough 34 through which the filter web or belt travels continuously with rotation of the filter drum and which will act to remove blind spots from the filter medium prior to its return to the drum for submersion in the slurry bath. It is also evident that the construction described provides for a complete separation of the wash liquid for the filter medium from the slurry feed for the filter drum and additionally provides for an efficient and effective washing operation by reason of the removal of filter cake from the web prior to its entrance into the washing bath.

In addition to the important factor of permitting the controlled use of costly filter medium washing liquids the foregoing construction also provides for the ready flushing out of the washing bath by reason of the adjustable construction of the flexible partition 42. Reference to Fig. 4 of the drawings will make evident the ability to move the flexible partition 42 from a normal liquid-retaining position, as is shown therein in full line, to a bath-dumping position, as is shown therein in dotted line. When the solid accumulation within the filter medium washing bath has reached a maximum it is possible to move the flexible partition 42 as indicated to permit the contents of the bath to be quickly discharged into the slurry feed in the tank 16 to flush the solid accumulation therefrom whereupon the flexible partition is returned to its liquid-retaining position to permit an accumulation of a second cleaning liquid bath within the pan 38.

Referring now to Figs. 6 and 7 of the drawings there is illustrated a modified form of the washing apparatus constituting a part of the present invention wherein the construction of the washing trough 34, washing bath pan 38 and overflow box 66 are identical to those previously described but wherein the construction of the partition or inner end wall of the pan is different. In this modified form a rotatable bar 82 is mounted longitudinally of the trough 34 at a spaced distance above the inner lowermost end of the pan 38 with one end of the bar 82 carrying a handle 84 externally of the trough to permit rotation of the bar about its axis. Within the trough a solid plate or wall member 86 is secured to the bar to extend in a normal vertical position above the lower innermost end of the pan 38 with a rubber or the like sealing strip 88 secured to the bottom longitudinal edge of the plate 86 and along the vertical end edges of the plate which, when the wall 86 is vertically positioned, by resilient engagement forms a liquid-tight joint between the wall 86 and the bottom of the pan 38 and the inner faces of the end walls of the trough 34. By this construction the plate 86 forms a liquid-retaining wall at the inner end of the pan to permit a liquid wash bath to be contained in the pan which, for the purposes of flushing solid accumulation from the bath, may be pivoted as indicated in dotted line in Fig. 7 by rotation of the bar 82 to permit the bath contents to empty into the slurry tank 16. Accordingly, the modified form of the invention provides a construction having all the advantages attributed to the first described embodiment above and satisfying all of those objects and advantages heretofore set forth.

Accordingly having thus described and explained the construction and function of the present invention and the new and useful results obtained thereby, I claim:

1. In a travelling web filter consisting of a rotary drum having a filter deck, a guide roller spaced from said drum, an endless filter medium extending over said drum and said roller, means for separate removal of filter cake formed on the filter medium, means for rotating said drum in a slurry tank to dispose successive portions of the filter medium in a slurry, filter medium washing apparatus including a wash liquid retaining trough having one of its walls pivotally mounted for selective movement from a liquid retaining to a dumping position, whereby washed off solids accumulated therein may be dumped into the slurry tank, a wash liquid inlet communicating with said trough, and a wash liquid outlet communicating with said trough, said outlet including an adjustable dam interposed between said trough and the exit end of said outlet whereby the depth of wash liquid in said trough may be selectively controlled and emptied separate from said slurry tank.

2. Filter medium washing apparatus as defined in claim 1 wherein said adjustable dam is comprised of a plurality of superimposed removable weirs.

3. Filter medium washing apparatus as defined in claim 1 wherein one wall of said wash liquid-retaining trough is flexibly secured to the bottom and sides of said trough, the upper end of said wall carrying a slotted bracket, said slotted bracket having sliding engagement with a fixed pin in the adjacent side of said trough, and selectively operable locking means between said slotted bracket, and said pin for selectively positioning said wall in liquid-retaining and dumping positions.

4. Filter medium washing apparatus as defined in claim 1 wherein one wall of said trough is mounted on a rotatable pivot, sealing means are interposed between the bottom edge and vertical ends of said wall and the bottom and side walls of said trough, and means for rotating said pivot to selectively position said wall in liquid-retaining and dumping positions.

References Cited in the file of this patent
UNITED STATES PATENTS

| 201,602 | Fisher | Mar. 26, 1878 |
| 952,658 | Worley | Mar. 22, 1910 |
| 2,308,031 | Schmitz | Jan. 12, 1943 |